L. W. JONES.
MELTING POT.
APPLICATION FILED DEC. 6, 1920.

1,387,780.

Patented Aug. 16, 1921.

INVENTOR
Louis W. Jones.
by Hazard & Miller
ATTYS.

UNITED STATES PATENT OFFICE.

LOUIS W. JONES, OF LOS ANGELES, CALIFORNIA.

MELTING-POT.

1,387,780.  Specification of Letters Patent.  Patented Aug. 16, 1921.

Application filed December 6, 1920. Serial No. 428,731.

*To all whom it may concern:*

Be it known that I, LOUIS W. JONES, a citizen of the United States, residing at Los Angeles, in the county of Los Angeles and State of California, have invented new and useful Improvements in Melting-Pots, of which the following is a specification.

It is the object of this invention to provide a melting pot for remelting linotype and stereotype metal and for refining dross and the like. The invention contemplates the provision of means whereby an approximately air tight closure is provided for the melting pot, said closure being arranged as a hood having an exhaust flue, by means of which an appreciable amount of the air within the melting pot may be withdrawn so as to melt the metal in the presence of a decreased supply of oxygen and thereby prevent the accumulation of dross.

The invention will be readily understood from the following description of the accompanying drawings, in which.

Figure 1:
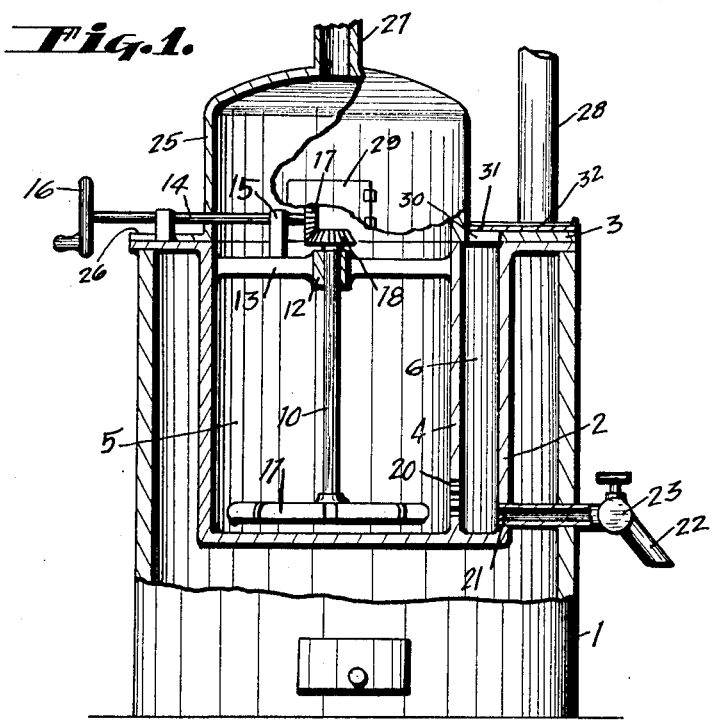
Figure 1 is a longitudinal section through a melting pot constructed in accordance with the invention.
Figure 2:
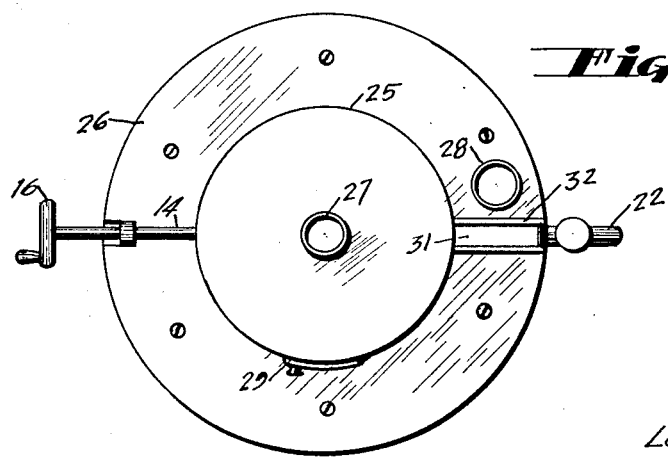
Fig. 2 is a top plan view of the same.

The improved melting pot is arranged to be received within a furnace 1 of any usual construction, the melting pot being shown as a receptacle 2 having an annular flange 3 resting upon the upper edge of the furnace for removably supporting the melting pot. The melting pot is divided at one side thereof by a longitudinally extending wall 4 forming a main melting chamber 5 and a substantially smaller chamber 6 at one side thereof.

A puddler is provided in the chamber 5, said puddler being shown as consisting of a main shaft 10 having the radially extending agitators 11 at the lower end thereof. The shaft 10 is journaled longitudinally of the chamber 5 as in a bearing 12 formed in a spider 13 supported within the chamber 5. A drive shaft 14 may be journaled in a bearing 15 also carried by the spider 13. This drive shaft extends outwardly beyond the melting pot above the same and is provided with a hand wheel 16 for rotating the same. The opposite end of the drive shaft extends inwardly above the melting pot to a point adjacent the main shaft 10 and a driving connection shown as beveled pinions 17 and 18 is provided between the shafts 14 and 10.

The chambers 5 and 6 communicate adjacent the base of the melting pot by means of the relatively small apertures 20 provided in the plate 4, and the chamber 6 is provided with a discharge port 21 adjacent the base of the melting pot which communicates with a spout 22 projecting through the wall of the furnace 1. The port 21 is controlled by the valve 23 arranged in spout 22 outside of the furnace casing.

A hood 25 is received over the melting pot as thus constructed, and is provided with an annular flange 26. The hood proper preferably alines with the chamber 5, and the flange 26 is received over chamber 6 and the annular flange 3 so as to rest upon the latter. The two flanges may be suitably connected, and the hood will thus form a substantially air tight closure for the melting pot. The operating rod 14 may extend outwardly through the hood 25, and a substantially air tight joint is formed where the rod passes through the hood.

A flue 27 extends from hood 25 and a blower or the like (not shown) is mounted in this flue for exhausting air from the melting pot. A flue 28 is preferably also provided leading from the furnace chamber through suitable openings in flanges 26 and 3. A charging door 29 of usual construction may also be provided in the hood. An opening 30 is preferably provided in flange 26 above chamber 6, so that access may be had to the latter, and this opening is preferably closed by a sliding closure 31 moving in guide ways 32.

It will thus be seen that I have provided a melting pot in which the metal may be agitated and the clean metal removed, the hood construction employed in connection with the melting pot providing means whereby air may be withdrawn from the melting pot during the melting operation in order to reduce the accumulation of dross by reducing the oxygen supply within the melting pot.

Various changes may be made without departing from the spirit of the invention as claimed.

What is claimed is:

A melting pot having a melting chamber and a reservoir chamber with an annular flange surrounding said chambers, and a hood received over said melting chamber and having a flange received over the reservoir chamber and coöperating with the first flange to form an air tight closure, the flange of the hood having an opening therein communicating with the reservoir chamber, and a closure for said opening.

In testimony whereof I have signed my name to this specification.

LOUIS W. JONES.